July 2, 1957
E. DOMINGO ET AL
2,798,215
LIQUID DETECTING DEVICE
Filed Dec. 13, 1954
3 Sheets-Sheet 1
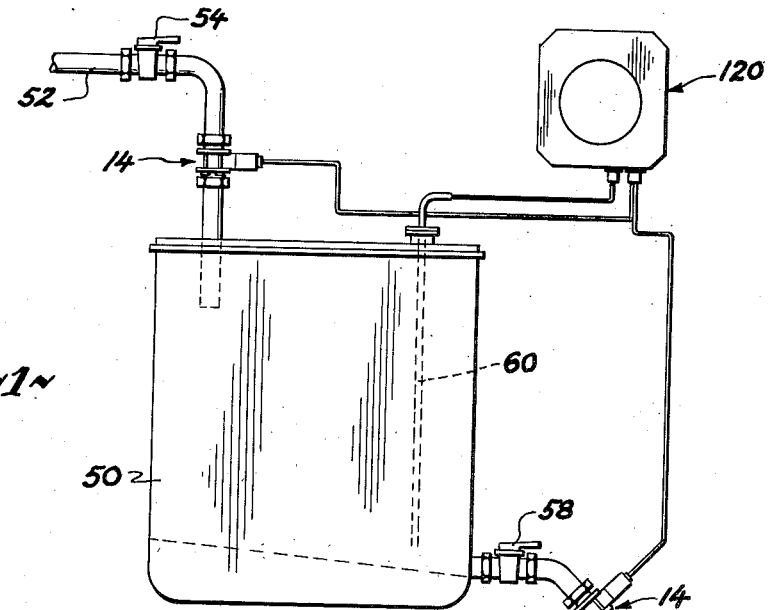
Fig.~1~
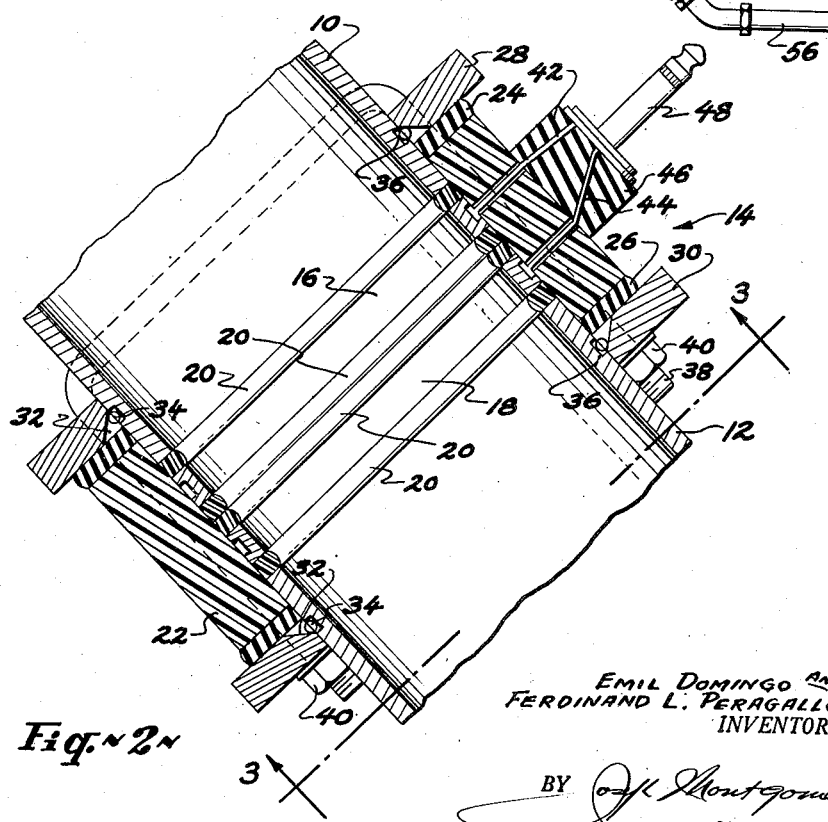
Fig.~2~
EMIL DOMINGO AND
FERDINAND L. PERAGALLO
INVENTORS
BY
ATTORNEY.

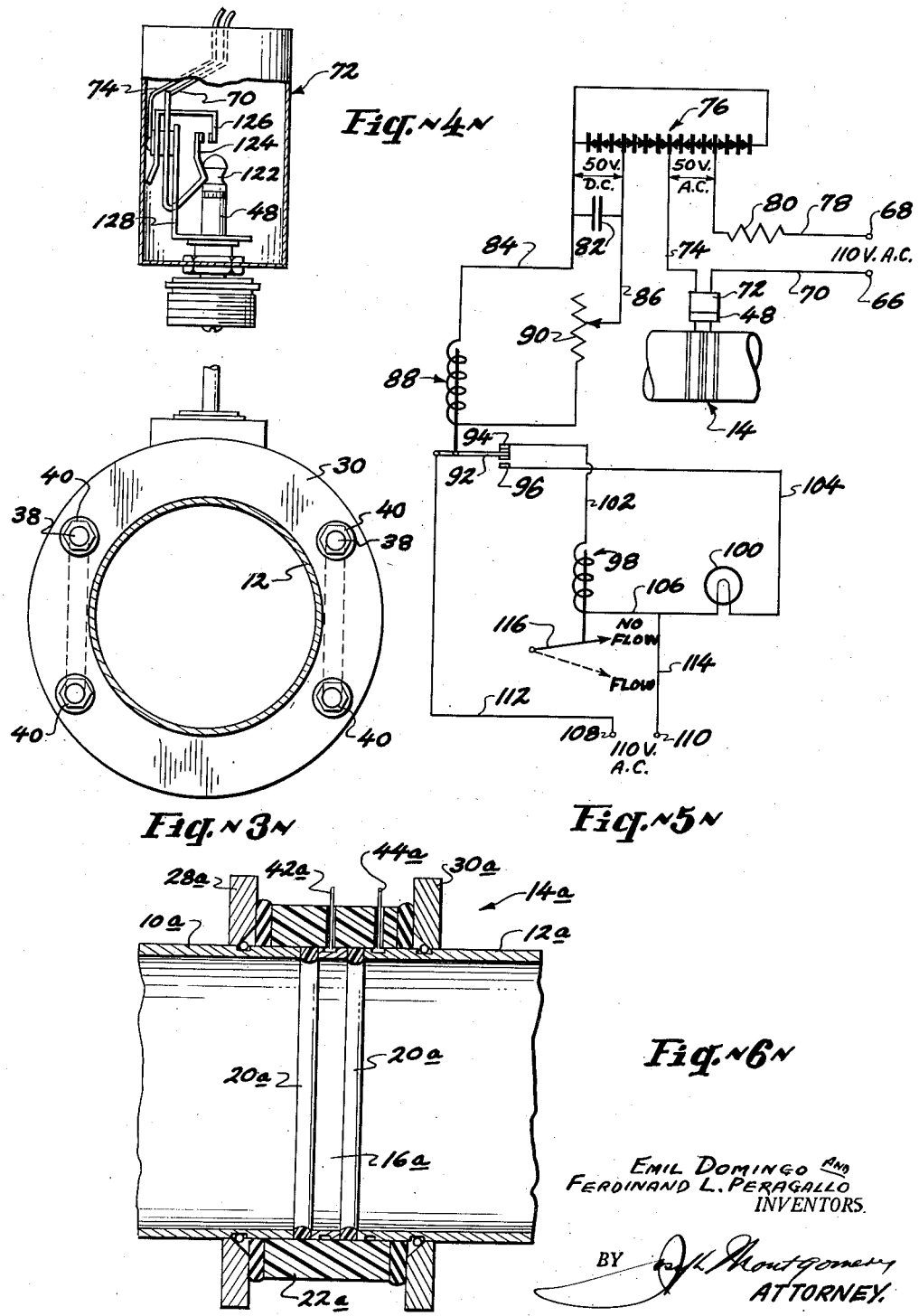

July 2, 1957
E. DOMINGO ET AL
2,798,215
LIQUID DETECTING DEVICE
Filed Dec. 13, 1954
3 Sheets-Sheet 3
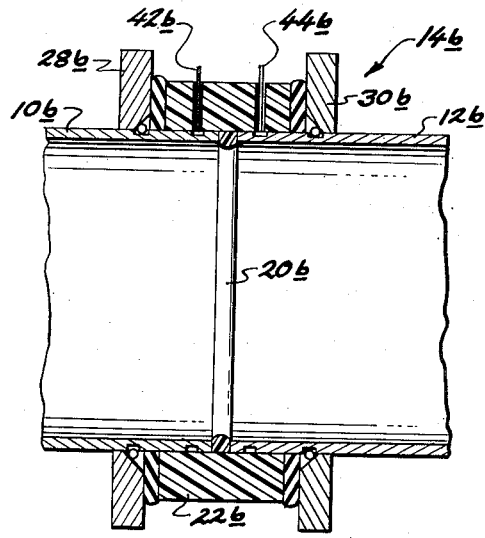
Fig. ~7~
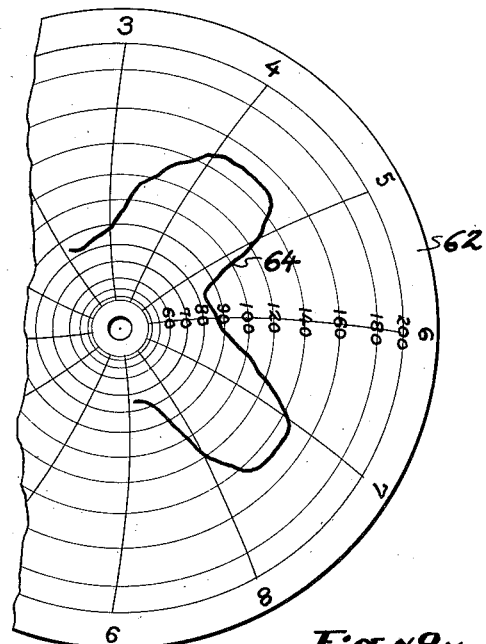
Fig. ~8~
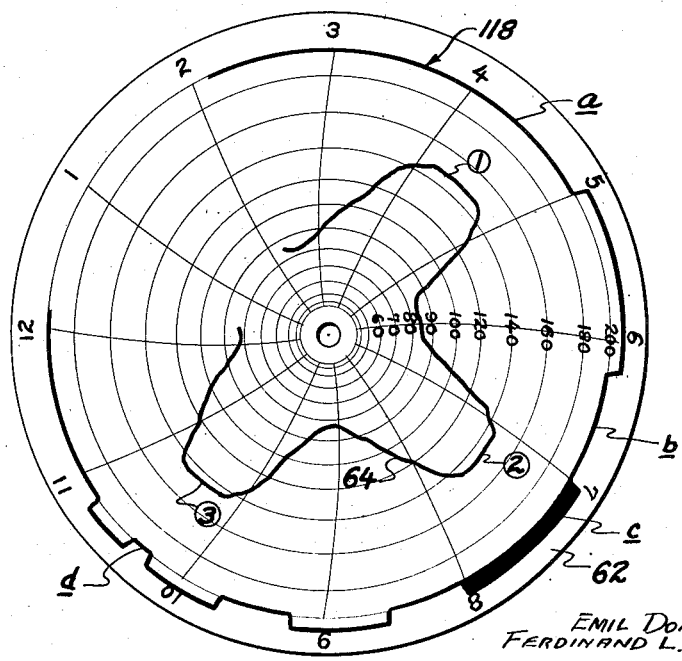
Fig. ~9~
EMIL DOMINGO AND
FERDINAND L. PERAGALLO
INVENTORS
BY Jack Montgomery
ATTORNEY.

United States Patent Office 2,798,215
Patented July 2, 1957

2,798,215

LIQUID DETECTING DEVICE

Emil Domingo, New York, N. Y., and Ferdinand L. Peragallo, Oakland, N. J., assignors to Henze Instrument and Valve Inc., Hoboken, N. J., a corporation of New Jersey Application December 13, 1954, Serial No. 474,788

10 Claims. (Cl. 340—239)

The present invention relates generally to liquid detecting devices, and is particularly directed to liquid detecting devices depending upon the electrical conductivity of the liquid for their operation.

A general object of the invention is to provide a liquid detecting device which may be embodied in a pipe or conduit through which a liquid flows for the purpose of indicating the presence or absence of a liquid flow or for indicating any changes in the composition of the liquid flowing through the associated pipe in response to the corresponding changes in the conductivity of the liquid, or which may be associated with a tank or receptacle for indicating the level of a liquid therein.

Heretofore, it has been proposed to employ detecting devices in pipes and the like which include a pair of spaced apart electrodes or contact wires interposed in an electrical indicating circuit and positioned within the associated pipe so that, when a conducting liquid flows through the pipe, the liquid establishes a conducting bridge between the electrodes immersed therein and thereby completes the indicating circuit. However, if the contact wires or electrodes of the above described device are disposed close to the bottom of the inner surface of the associated pipe, so as to be sensitive to a relatively small flow, the device can only be used in one position, and, if the electrodes are disposed adjacent the center of the pipe to permit use of the device in any position, such centrally located electrodes will only be immersed in the liquid when the flow of the latter is sufficient to more than half fill the pipe and, therefore, the indicating device will be insensitive to relatively small rates of flow through the pipe, for example, as caused by leaking or defective vales. Further, in the existing liquid detecting devices, the contact wires or electrodes and the supporting structure therefor from an obstruction within the associated pipe which retards the flow through the pipe and results in a pressure drop that may be undesirable in certain applications. The obstruction within the pipe, formed by the electrodes and their supporting structure, also adds to the danger that solid materials contained in the liquid flow may build-up around the obstruction and finally block the flow through the pipe, while such obstruction makes the thorough cleaning of the interior of the pipe a difficult operation, particularly in applications where the need for sanitation is most urgent, for example, in milk pasteurizing plants.

Accordingly, it is a specific object of the invention to provide a liquid detecting device which may be used in any position, can detect even a slow or drop-by-drop flow through the associated pipe, and leaves the interior of the pipe substantially unobstructed thereby to avoid the build-up of solids within the pipe at the location of the detecting device leading to eventual clogging of the pipe and to facilitate cleaning of the pipe.

Another object is to provide a liquid detecting device having the foregoing characteristics, and wherein the device may be embodied in any desired liquid conveying pipe without limitation as to the pressure or temperature of the liquid or the size of the associated pipe.

A further object is to provide a liquid detecting device of the described character which can be employed in systems handling corrosive liquids, and which forms a completely leakproof extension of the associated pipe.

Still another object is to provide a liquid detecting device embodied in an indicating system to show the existence of a flow through the associated pipe, particularly the pipes leading to and from a milk pasteurizing vat or the like, and wherein said system and its connection to the detecting device are arranged so that, in the event of any failure in the system or its connection to the detecting device, a flow will be indicated.

Still another object is to provide a liquid detecting device embodied in an indicating system, particularly for indicating a flow through the pipes leading to and from a milk pasteurizing vat or the like, and wherein such indicating system may be incorporated in existing instruments recording the temperatures in the vat in relation to time so that a single record sheet, showing the temperatures in the vat and the flow conditions in the pipes leading to and from the vat all in relation to time, will indicate whether the conditions for proper pasteurization have been maintained.

In accordance with the present invention, the liquid detecting device associated with a pipe includes at least two conducting rings, one or more of which may be formed by a section or sections, respectively, of the associated pipe, said conducting rings having the same internal diameter as the pipe and being separated by insulating rings of a plastic, preferably tetrafluoroethylene, having hydrophobic characteristics. The conducting rings and the insulating rings, which originally have the same inner diameter as the conducting rings, are assembled axially to form an extension of the associated pipe and, when an axial clamping pressure is exerted on the assembly to render it leakproof, the insulating rings are radially thickened to form annular ribs or projections at the interior of the pipe between the conducting rings so that, in the event of a drop-by-drop or leaking flow through the pipe, the liquid will build-up against such annular projections until sufficient liquid has collected to form a drop capable of bridging the insulating rings and establishing electrical contact between the separated conducting rings.

In one embodiment of the invention, the detecting device includes two conducting rings which are separated from each other and from the adjacent sections of the associated pipe, between which the conducting rings are interposed, by insulating rings of the described character. In another embodiment of the invention, one conducting ring is interposed between two sections of the associated pipe and is separated from both sections by insulating rings, and one of the sections of the pipe is employed as the second conducting ring. In still another embodiment of the invention, two sections of the pipe, separated by one or more insulating rings, are employed as the conducting rings in the liquid detecting device.

Further, in accordance with the invention, the conducting rings of the detecting device are interposed in an electrical circuit which operates either a signalling, recording or controlling mechanism, or any combination of such mechanisms, in response to either the presence of liquid establishing an electrical conducting path between the conducting rings or the absence of such a conducting path, or in response to changes in the conductivity of the liquid bridging the conducting rings thereby indicating variations in the composition of the liquid.

The above, and other objects, features and advantages of the invention will be apparent in the following detailed description of illustrative embodiments thereof, particularly when the description is read in connection with the accompanying drawings, wherein:

Fig. 1 is an elevational view of a milk pasteurizing vat assembly embodying detecting devices according to the present invention;

Fig. 2 is an axial, sectional view of a pipe for conveying a liquid and having a detecting device therein in accordance with one embodiment of the invention;

Fig. 3 is a sectional view taken along the line 3—3 of Fig. 2, but on a smaller scale;

Fig. 4 is a detail, elevational view of an electrical connection provided between a detecting device embodying this invention and an associated electrical circuit for operating a signalling, recording or controlling mechanism;

Fig. 5 is a wiring diagram of a combined signalling and recording mechanism associated with a liquid detecting device in accordance with this invention;

Fig. 6 is an axial, sectional view of a liquid conveying pipe having a detecting device therein in accordance with another embodiment of the invention;

Fig. 7 is a view similar to Fig. 6, but showing still another embodiment of the invention;

Fig. 8 is a fragmentary plan view of a card or sheet having a conventional record of a milk pasteurizing process thereon; and Fig. 9 is a plan view of a card or sheet having both the conventional record and the record of flow provided by the present invention in order to illustrate the advantages obtained in the control and inspection of a milk pasteurizing process.

Referring to the drawings in detail, and initially to Fig. 2 thereof, a pipe for conveying a liquid is there shown to be made up of two axially separated sections 10 and 12. The pipe sections, in the embodiment shown in Fig. 2, may be formed of any suitable metal or of any non-conducting material that may be required by reason of the characteristics of the liquid flowing therethrough. Associated with the pipe sections 10 and 12 is a liquid detecting device which is generally identified by the reference numeral 14 and includes two contacting or electrode rings 16 and 18 formed of metal and having the same inner diameters as the pipe sections. Interposed axially between the contacting rings 16 and 18, and between such rings and the pipe sections 10 and 12, are insulating rings 20 which are preferably formed of a hydrophobic plastic resin, that is, a plastic resin to which liquids do not adhere, for example, tetrafluoroethylene. The insulating rings 20 normally have inner diameters which are the same as the inner diameters of the contacting rings and pipe sections, but, when the several rings and the pipe sections are clamped axially together and the plastic insulating rings 20 are compressed to provide a leak-proof seal between the rings 16 and 18 and the pipe sections 10 and 12, the inner diameters of the rings 20 are correspondingly reduced so that they then project radially inward beyond the inner surfaces of the coaxial pipe sections and contacting rings to form annular dams or ribs, as seen in Fig. 2, for a purpose hereinafter described in detail.

In the embodiment of the invention illustrated in Fig. 2, the contacting and insulating rings and the pipe section are clamped axially together by an arrangement providing a leak-proof coupling between the pipe sections. This coupling includes a sleeve 22, formed of a suitable plastic resin or other insulating material, which telescopes over the rings 16, 18 and 20 and the adjacent end portions of the pipe sections 10 and 12. Sealing rings or gaskets 24 and 26 which may be formed of rubber are disposed around the pipe sections 10 and 12, respectively and abut against the adjacent end faces of the sleeve 22. Annular clamping plates or rings 28 and 30 slide over the pipe sections 10 and 12, respectively, and the inner edges of the clamping rings, at the sides facing toward the sealing rings, are bevelled, as at 32, to act against split rings 34 which are disposed in annular grooves 36 formed in the outer surfaces of the pipe sections 10 and 12.

Thus, when the clamping rings 28 and 30 are drawn axially together, the pipe sections 10 and 12 are similarly moved axially toward each other by the cooperation of the bevelled edges 32 with the split rings 34 in the grooves 36, and the contacting and insulating rings are thereby compacted to compress the insulating rings 20 and cause the desired reduction of the inner diameter of the latter. Simultaneously, the clamping rings 28 and 30 act against the sealing rings 24 and 26 to compress the sealing rings between the clamping rings and the sleeve 22 and thereby provide a liquid tight coupling between the pipe sections and around the assembly of contacting and insulating rings.

In order to draw together the clamping rings 28 and 30, suitable bolts are extended through aligned openings in the clamping rings, for example, as shown on Figs. 2 and 3, two U-bolts 38 are provided with their legs extending parallel to the axis of the pipe sections and through the clamping rings and with suitable securing nuts 40 being screwed on the threaded ends of the bolt legs.

In accordance with the invention, contacting rings 16 and 18 are interposed in an electrical circuit so that, in the absence of any liquid flowing through the pipe to establish a conducting path between the rings 16 and 18, the electrical circuit is interrupted, while the bridging of the contacting rings 16 and 18 by a conducting liquid completes the electrical circuit to indicate either the presence of a liquid flow through the pipe or changes in the composition of the liquid in response to variations in its conducting characteristics, where the flow is continuous.

As seen in Fig. 2, conducting wires 42 and 44 extend through radial bores in the sleeve 22 and at their inner ends are connected to the contacting rings 16 and 18, respectively, for example, by intimate engagement, as by soldering, in grooves formed in the outer surfaces of the contacting rings, while the outer ends of the wires 42 and 44 extend through an insulating adapter block 46 which is suitably secured to the sleeve 22. The male member 48 of a connector or receptacle, hereinafter described in detail, is mounted on the block 46 and suitably connected to the wires 42 and 44 to provide a separable connection between the electrical elements of the detecting device 14 and the electrical circuit of an associated signalling, recording or controlling mechanism.

Although the conductive liquid is intended to bridge the gap between two contacting rings 16 and 18 which are separate from, and in addition to, the pipe sections 10 and 12 in the embodiment of Fig. 2, it is to be noted that the invention is not limited to such an arrangement. For example, as shown in Fig. 6, a detecting device, generally identified by the reference numeral 14a, may, in accordance with this invention, include a single contacting ring 16a which is axially separated from the pipe sections 10a and 12a by insulating rings 20a, all of such parts and the remainder of the structure in Fig. 6 being similar to the correspondingly numbered parts of the embodiment in Fig. 2. Then, the bridge of conductive liquid is established across the insulating rings and between the contacting ring 16a and one or the other of the pipe sections 10a and 12a which, in this embodiment must be formed of an electrically conductive metal. In the illustrated detecting device 14a the wires 42a and 44a are respectively connected to the contacting ring 16a and to the pipe section 12a which thereby replaces, or eliminates the necessity for, the second contacting ring 18 of the device in Fig. 2.

Still another embodiment of the invention is illustrated in Fig. 7, wherein the detecting device 14b merely provides one or more insulating rings 20b between the ends of the pipe sections 10b and 12b which are of metal and respectively connected to the wires 42b and 44b so that the associated electrical circuit will be completed by a conductive liquid bridging the insulating ring or rings to simultaneously contact the pipe sections 10b and 12b. In the embodiment of Fig. 7, it is to be understood that the numbered parts thereof, although not specifically described, are all similar, in structure and function, to the correspondingly numbered parts described in connection with Fig. 2.

Although the arrangements shown in Figs. 6 and 7, respectively, are operative for the described purpose, it is apparent that there is some shock hazard involved in their operation, particularly with the arrangement shown in Fig. 7, and that in the latter it is necessary to insulate the pipe section 10b from the pipe section 12b so that the only possible conducting path therebetween will be provided by the liquid flowing through the pipe.

The advantages of the described detecting devices are apparent in that such detecting devices may be mounted in any position and the liquid flowing through the associated pipe can establish a bridging contact between the contacting rings, the single contacting ring and one of the pipe sections, or the two pipe sections, as the case may be, whether the flow of liquid is considerable and fills the pipe or is merely a trickle against the wall surface of the pipe. Further, by reason of the fact that the insulating rings are formed of a hydrophobic plastic, preferably tetrafluoroethylene, such insulating rings have a tendency to separate any film of liquid clinging to the wall surface of the pipe even after the flow of liquid has been interrupted and thereby gives a positive break in the electric circuit in response to the interruption of the flow. The compressed insulating rings which form annular dams or ribs within the pipe between the electrodes constituted by the contacting rings or by the pipe sections also ensure the positive action of the detecting device in the presence of a very small flow, for example, as caused by a leaking valve, in that such dams separate the thin stream of liquid, which of itself would not contact the electrodes over a sufficiently wide area to provide a good conducting bridge therebetween, into a succession of relatively large parts or drops which build-up against the up-stream dam until the liquid has accumulated to form a large drop capable of flowing over the insulating rings and establishing a conducting bridge between the electrodes of a magnitude capable of being detected. It is also apparent that, since the interior of the pipe having the detecting device therein is substantially unobstructed by the latter, the detecting device does not cause an objectionable pressure drop, nor does it promote the collection or accumulation of solids from the liquid flow to eventually clog the pipe or interfere with the effective easy cleaning of the pipe.

Detecting devices of the above described character have many applications. For example, in apparatus for the batch processing of liquids in a vat or tank, leaking of a valve in the pipe leading to the vat can contaminate the batch being treated or processed and result in deterioration of the quality of the product or its complete spoilage, while leakage of a valve in the outlet pipe can result in the removal of the liquid from the vat prior to the completion of the process. In such apparatus, detecting devices of the above described character can be embodied in the inlet and outlet pipes and associated with electrical mechanism which will indicate or record the existence of a flow in either pipe during the process.

Detecting devices embodying the present invention can also be employed for the purpose of indicating or recording the changes in the composition of a liquid flowing through an associated pipe in response to variations in the conductivity of the liquid; for example, in apparatus for purifying or distilling sea water so that it may be used as drinking water on military or commercial ships, detecting devices of the described character may be embodied in the supply pipes to actuate a warning signal when the salt or other impurities in the distilled water reach an undesirable level, thereby to safeguard the health of the passengers and crew.

Further, detecting devices embodying this invention can be employed, in combination with suitable electrical indicating, recording or controlling circuits, to indicate, record or control the level of a liquid in a liquid in a tank, vat and the like. For example, two or more of such detecting devices can be installed at different levels in a sight or column gauge, or in a vertical pipe apart from such gauge opening at it opposite ends into the associated tank, such as, a boiler, whereby circuits controlled by the detecting devices will indicate when the liquid level is between the levels of the detecting devices, or above or below the upper and lower limits established by the levels of the detecting devices.

Referring now to Figs. 1 and 5 of the drawings, the application of the present invention to apparatus for the pasteurizing of milk in batches is there illustrated. Such apparatus includes a vat or tank 50 (Fig. 1) having an inlet pipe 52 opening into the top thereof to supply unpasteurized or raw milk to the vat, with the flow through pipe 52 being controlled by a valve 54, and an outlet pipe 56 extending from the bottom of the vat 50 for conveying the pasteurized milk to a storage tank (not shown), with the flow through th outlet pipe 56 being controlled by a valve 58 therein. The vat 50 has electrical heating elements (not shown) therein, and a temperature responsive bulb 60 extends into the vat to a location adjacent the bottom of the latter and controls a temperature recording device of conventional construction which provides a record similar to that pictured in Fig. 8.

In the pasteurizing of milk by the "batch" method, a batch of raw milk is supplied through pipe 52 to the vat 50 and both valves 54 and 58 are then closed to segregate the batch from the raw milk and the previously pasteurized milk. Then the batch of milk is heated to 143° F. and must be maintained at that temperature for one-half hour. Following the completion of the pasteurization, the valve 58 is opened to permit the pasteurized milk to leave the vat 50 and flow to the storage tank. After the vat has been emptied, valve 58 is closed and valve 54 is opened to permit a new batch of raw milk to flow into the vat.

It is apparent that if raw milk is permitted to flow through pipe 52 into vat 50 during the pasteurizing of a batch, such raw milk will not be fully pasteurized for the required period and will contaminate the batch. Similarly, if flow is permitted through pipe 56 before completion of the pasteurizing process, the milk flowing through pipe 56 into the storage tank will not meet the standards of pasteurized milk and will contaminate the supply of pasteurized milk in the storage tank. Further, if the rate of flow through the pipe 52 or the pipe 56 is relatively low, such contaminating flow can take place without appreciably affecting the temperature within the vat. Referring to Fig. 8 of the drawings, a portion of a record sheet or card 62 having a heavy line 64 thereon as traced by the usual temperature recording device controlled by the bulb 60. The radially spaced circular lines on the card 62 indicate the temperatures, while the angularly spaced, generally radial lines represent the intervals of time as the card is rotated about its center by a suitable clock-wok mechanism. The heavy line 64 of Fig. 8 repesents the temperature conditions in relation to time within the vat 50 during the pasteurization of two successive batches of milk. From the card 62 it would appear that each batch of milk was heated to a temperature of at least 143° F. and then maintained at that temperature for one-half hour. However, since the temperature within the vat 50 would not be sensitive to a flow of liquid through the pipe 52 or the pipe 56 during the half hour of heating at 143° F., it is apparent that an examination of the card 62 does not assure that the entire batch being considered has been subjected to the required heating for the full period. Accordingly, the existing controls are incomplete, in that the valves 54 and 58 may be defective and permit a leaking flow of milk therethrough, or such valves may not be completely closed or may be opened prior to end of the full period of pasteurization, either through inadvertent mistake or intentionally, thereby to add raw milk to the batch or to release milk from the vat before the completion of the pasteurizing process, and such conditions will not be evident on the card 62.

In accordance with the present invention, the above deficiencies of the controls now employed in connection with the batch pasteurizing of milk are avoided by providing detecting devices 14 of the kind previously described, interposed in the pipes 52 and 56 at locations between the valve 54 and vat 50 and downstream from the valve 58, respectively, with such detecting devices having electrical indicating and recording arrangements associated therewith to indicate on the record sheet 62 the existence or absence of a liquid flow through the related pipes.

Referring to Fig. 5, the wiring diagram of an indicating and recording arrangement associated with one of the detecting devices 14 is there illustrated, it being understood that a similar arrangement is associated with the other detecting device. The arrangement shown in Fig. 5 operates on a supply of alternating current, since such current is more likely to be available, but the arrangement can be converted to use with a source of direct current merely by eliminating the current rectifying components of the circuit and by employing warning lights, pen operating solenoids and control relays which are adapted for energization by direct current.

In the arrangement of Fig. 5, the alterating current is supplied to the terminals 66 and 68. A line 70 leads from terminal 66 to a female member 72 which engages the male member 48 to provide a separable connection to the detecting device 14, and a line 74 leads from the female member 72 to the input of a solenium rectifier 76. A line 78 running from terminal 68 to the input of the rectifier 76 has a resistance 80 interposed therein to decrease the original voltage, for example, to 50 volts. The rectifier 76 converts the alternating current, fed thereto when the contacting rings of the detecting device 14 are bridged by a conductive liquid, to a pulsating direct current, and a condenser 82 is connected across leads 84 and 86 extending from the output terminals of the rectifier to the coil of a relay 88 for the purpose of smoothing out the pulsating direct current from the rectifier. A potentiometer or variable resistance 90 is interposed in the line 86 to provide for varying of the sensitivity of the circuit.

The relay 88 operates a movable contact 92 which alternately engages one of the fixed contacts 94 and 96, the fixed contacts being arranged so that, when the coil of relay 88 is energized, contact 92 engages contact 96, and, when the coil of relay 88 is not energized, contact 92 engages contact 94, as shown in Fig. 5. A pen actuating solenoid 98 and a warning or signal lamp 100 are connected to the contacts 94 and 96, respectively, by lines 102 and 104, and to each other by a line 106, and terminals 108 and 110, to which alternating current is supplied, are connected to the contact 92 and to the line 106 by lines 112 and 114, respectively. Thus, when relay 88 is not energized, the contacts 92 and 94 complete the circuit through solenoid 98 and the latter is energized, while the circuit through lamp 100 is interrupted. On the other hand, when relay 88 is energized, by the bridging of the contacting rings in the detecting device 14, or otherwise, the contacts 92 and 96 close the circuit through the warning lamp 100, while the circuit through the solenoid 98 is interrupted. The solenoid 98 is arranged to actuate a recording pen 116 which is moved to a "no-flow" indicating position (shown in full lines on Fig. 5) when the solenoid 98 is energized, and which moves to a "flow" indicating position (shown in broken lines on Fig. 5) when the solenoid 98 is deenergized.

The recording pen 116 may be embodied in the existing recording device, for example, in the device recording or tracing the temperature-time line 64 on the card 62, to trace an additional line 118 on the peripheral portion of the card 62 (Fig. 9). The pen 116 is arranged with respect to the axis of rotation of the card 62 so that it is disposed closer to that axis or center of the card when in its "flow" indicating position than when in its "no-flow" indicating position.

The card 62 illustrated in Fig. 9 represents the possible conditions that may be indicated by the line 118 during the processing of three batches, represented by the portions (1), (2) and (3) of line 64, which so far as the temperature-time line is concerned, all conformed to the minimum legal requirements. Thus, during the processing of batch (1) the related detecting device has caused a "flow" indication throughout the process represented by the portion a of line 118, as a result of a badly leaking valve or of the failure to completely close the valve; during batch (2), the portions b and c of line 118 indicate that a slow leak was present throughout the cycle, with the solid portion c being caused by a drop-by-drop flow through the pipe which alternately opened and closed the circuit to the relay 88, thereby moving the pen 116 back and forth between its "no flow" and "flow" positions in a brushing action on the card 62; and during batch (3), the portion d of line 118 indicates that, at approximately the middle of the process, a valve was inadvertently opened and this condition was recognized and corrected after approximately ten minutes.

By reason of the present invention, the three batches of milk represented on the card of chart of Fig. 9 are indicated to be improperly pasteurized, although the above described conditions would have been undiscovered with the heretofore employed recording devices.

Although the wiring diagram shown in Fig. 5 employs only a single detecting device 14 to control the pen 116, so that an individual pen and control circuit would be required for each of the detecting devices in the pipes 52 and 56 of the apparatus in Fig. 1, it is to be understood that both of the detecting devices may, if desired, be connected in parallel between the lines 70 and 74 of Fig. 5, and in that case, the pen 116 will be moved to its "flow" indicating position whenever the contacting rings of one or the other, or of both, of the detecting devices are bridged by a conductive liquid in the related pipes. Whether one pen, or separate pens, is or are employed for indicating the flow conditions in the pipes 52 and 56, the temperature-time indicating mechanism and the flow-time mechanism embodying this invention are preferably incorporated in a single device, indicated generally at 120 on Fig. 1, and provide a simultaneous record of the temperature and flow conditions on a single card, as shown in Fig. 9.

In order to ensure that a "no-flow" indication on the record card is truly a representation of the actual conditions in the associated pipes and not caused by a failure to supply current to the recording device or to engage the male and female members 48 and 72 of the separable receptacles at each detecting device 14, the supply terminals 66, 68, 108 and 110 are preferably connected to a single terminal strip, whereby a failure of the current supply deenergizes solenoid 98 and moves pen 116 to its "flow" indicating position, and each of the female members 72 is of the shorting-type to provide a completed circuit therethrough when the member 72 is disengaged from the related male member 48.

In Fig. 4, a suitable shorting-type female member 72 is shown engaged with the male member 48. It will be seen that the central contact or post 122 of the male member 48 engages a resilient contact strip 124 of the member 72 and moves the strip 124 away from a fixed contact strip 126, while the base contact of the male member 48 engages a contact plate 128 which is electrically connected to the strip 126. The leads 70 and 74 are respectively connected to the contact strips 124 and 126 within the female member 72. When the female and male members of the receptacle are engaged, as in Fig. 4, the circuit between the leads 70 and 74 is completed only by conductive liquid bridging the contacting rings connected to central contact and base of the male member 48. However, when the female member 72 is removed from the male member 48, the resilient contact strip 124 engages the contact strip 126 and the circuit between the leads 70 and 74 is thereby completed to energize the relay 88 (Fig. 5) and cause the movement of the pen 116 to its "flow" indicating position.

Although particular embodiments of the invention have been described in detail and illustrated in the accompanying drawings, it is to be understood that such particular embodiments have been presented merely by way of example and not as representing limitations on the invention, and that various changes and modifications may be effected in such embodiments by a person skilled in the art without departing from the scope or spirit of the invention as defined in the appended claims.

What is claimed is:

1. A liquid detecting device comprising at least two coaxial, cylindrical contacting members through which the liquid to be detected can flow, at least one insulating ring interposed coaxially between said contacting members, said insulating ring having a normal inner diameter equal to that of said contacting members and being formed of a deformable material, means for axially compacting said contacting members and insulating ring so that the latter is axially compressed and thereby its inner diameter is reduced to define an annular dam between said contacting members which, in the case of a very small flow of liquid, accumulates the liquid until a drop thereof is formed of sufficient size to bridge said contacting members over a substantial area across said insulating ring, and electrical circuit means having said contacting members interposed therein so that said circuit means is completed when a conductive liquid bridges said contacting members across said insulating ring.

2. A liquid detecting device comprising at least two coaxial, cylindrical contacting members through which the liquid to be detected can flow, at least one insulating ring interposed coaxially between said contacting members, said insulating ring have a normal inner diameter equal to that of said contacting members and being formed of deformable tetrafluorethylene which is hydrophobic and thereby tends to separate a film of liquid clinging to the inner surfaces of said contacting members, means for axially compacting said contacting members and insulating ring so that the latter is axially compressed and thereby its inner diameter is reduced to define an annular dam between said contacting members which, in the case of a very small flow of liquid, accumulates the liquid until a drop thereof is formed of sufficient size to bridge said contacting members over a substantial area across said insulating ring, and electrical circuit means having said contacting members interposed therein so that said circuit means is completed when a conductive liquid bridges said contacting members across said insulating ring.

3. A liquid detecting device comprising a pipe through which the liquid to be detected can flow, said pipe having two axially separated sections, a pair of cylindrical contacting rings coaxially arranged between said pipe sections and having the same inner diameters as the latter, insulating rings axially interposed between said contacting rings and between the contacting rings and said pipe sections to electrically insulate said contacting rings from each other and from said pipe sections, and electrical circuit means having said contacting rings interposed therein so that said circuit means is completed by conductive liquid bridging said contacting rings across the insulating rings therebetween as the liquid flows through said pipe.

4. A liquid detecting device comprising axially separated pipe sections through which the liquid to be detected can flow, a cylindrical contacting ring having the same inner diameter as said pipe sections and axially interposed between the latter, insulating rings interposed axially between said contacting ring and the adjacent ends of said pipe sections to electrically insulate said contacting ring from said pipe sections, and electrical circuit means having said contacting ring and one of said pipe sections interposed therein so that said circuit means is completed by conductive liquid bridging said contacting ring and said one pipe section during the flow of the liquid through said pipe sections.

5. A liquid detecting device comprising axially separated pipe sections through which the liquid to be detected can flow, said pipe sections being both formed of an electrical conducting material, an insulating ring axially interposed between the adjacent ends of said pipe sections to electrically insulate the latter from each other, and electrical circuit means having said pipe sections interposed therein so that said circuit means is completed by the conductive liquid flowing through said pipe sections and bridging the latter across said insulating ring.

6. In apparatus for effecting the batch pasteurization of milk; the combination of a heating vat, inlet and outlet pipes extending to and from said vat and each having a valve therein, a detecting device in at least one of said pipes at the downstream side of the related valve including contacting members adapted to be bridged by milk flowing through the related pipe, an electric circuit having said contacting members interposed therein so that said circuit is completed by bridging of said contacting members by milk flowing through said related pipe, indicating means energized by said circuit and operative to indicate a flow of milk through the related pipe when said circuit is completed, and a separable coupling between said contacting members of the detecting device and said circuit, said separable coupling including a jack fixed to said detecting device and a receptacle removably receiving said jack, said receptacle being operative, when removed from said jack, to complete said circuit so that, in the event that said separable coupling is not connected, said indicating means will show a flow of milk through the related pipe.

7. In apparatus for effecting the batch pasteurization of milk; the combination of a heating vat, inlet and outlet pipes extending to and from said vat and each having a valve therein, a detecting device in at least one of said pipes at the downstream side of the related valve including contacting members adapted to be bridged by milk flowing through the related pipe, an electric circuit having said contacting members interposed therein so that said circuit is completed by bridging of said contacting members by milk flowing through said related pipe, and indicating means including an operating solenoid, an indicating member movable by said solenoid between a "flow" indicating position when said solenoid is deenergized and a "no-flow" indicating position when said solenoid is energized, a supply of current for energizing said solenoid, and a control circuit extending from said supply to said solenoid and having a relay interposed therein operative to complete and interrupt said control circuit as said relay is deenergized and energized, respectively, the first mentioned circuit having said contacting members interposed therein being connected to said relay so that, when said supply feeding current to the control circuit fails, said solenoid disposes said indicating member in said "flow" indicating position of the latter, a separable coupling between said contacting members of the detecting device and said first mentioned circuit, said separable coupling including a jack fixed to said detecting device and a receptacle removably receiving said jack, said receptacle being operative, when removed from the jack, to complete said first circuit and thereby energize said relay so that, in the event that said separable coupling is left unconnected, said indicating member will be moved to its "flow" indicating position.

8. In apparatus for detecting the flow of liqiud through a pipe; the combination of two axially spaced apart sections of said pipe, two axially spaced apart contacting rings disposed in the gap between said pipe sections and having the same inner diameter as the latter, insulating rings interposed axially between said contacting rings and between the latter and said pipe sections, said insulating rings being of deformable material and having inner diameters which are normally the same as that of said contacting rings and pipe sections, a cylindrical insulating sleeve surrounding said contacting and insulating rings and the adjacent end portions of said pipe sections, annular clamping plates fitting over said end portions of the pipe sections, gaskets between said clamping plates and the end faces of said sleeve, cooperative means on said end portions of the pipe sections and on said clamping plates so that movement of the latter axially toward each other serves also to draw together said pipe sections, and mechanical means for drawing together said clamping plates thereby to simultaneously compress said gaskets and insulating rings, whereby said gaskets provide an effective leak-proof seal between the pipe sections and said insulating rings are squeezed radially inward to provide an effective leak-proof seal between the contacting rings and the pipe sections and to define annular dams between said contacting rings for accumulating a small flow of liquid until a drop of sufficient size has collected to ensure a proper bridging contact between the contacting members across the insulating rings therebetween.

9. In apparatus for detecting the flow of liquid through a pipe; the combination of two axially spaced apart sections of said pipe, a contacting ring disposed in the gap between said pipe sections and having the same inner diameter as the latter, deformable insulating rings interposed axially between said contacting ring and said pipe sections and having the same normal inner diameter as the pipe sections, a cylindrical insulating sleeve surrounding said contacting ring, the insulating rings and the adjacent end portions of said pipe sections, annular clamping plates fitting over said end portions of the pipe sections, gaskets between said clamping plates and the end faces of said sleeve, cooperative means on said end portions and on said clamping plates operative to move said pipe sections axially toward each other in response to axial drawing together of said plates, and mechanical means for drawing together said plates thereby simultaneously compressing said gaskets and insulating rings so that the gaskets provide an effective leakproof seal between the pipe sections and the insulating rings are squeezed radially inward to provide a leak-proof seal between the contacting ring and the adjacent pipe sections and to define annular dams between said contacting ring and the pipe sections for accumulating a small flow of liquid until a drop thereof of sufficient size has collected to ensure a proper bridging contact between said contacting ring and one of said pipe sections across the interposed insulating ring.

10. In apparatus for detecting the flow of liquid through a pipe; the combination of two axially spaced apart sections of said pipe, a deformable insulating ring in the gap between said pipe sections and having a normal inner diameter equal to that of said pipe sections, a cylindrical insulating sleeve surrounding the adjacent end portions of said pipe sections, annular clamping plates fitting over said end portions, gaskets between said plates and the end faces of said sleeve, cooperative means on said plates and end portions for communicating the axial movement of said plates toward each other to said pipe sections, and mechanical means for axially drawing together said clamping plates so that said gaskets and said insulating ring are simultaneously compressed, whereby said gaskets provide an effective leak-proof seal between the pipe sections and said insulating ring is squeezed radially inward to define an annular dam between the pipe sections against which a slow flow of liquid accumulates until a drop of sufficient size has collected to ensure a proper bridging contact between said pipe sections across the insulating ring.

References Cited in the file of this patent

UNITED STATES PATENTS

| 547,035 | Russell | Oct. 1, 1895 |
| 702,734 | Kelly et al. | June 17, 1902 |
| 1,165,921 | Recklinghousen | Dec. 28, 1915 |
| 2,439,354 | Wolcott | Apr. 6, 1948 |
| 2,552,088 | Davis | May 8, 1951 |
| 2,555,791 | Everett | June 5, 1951 |
| 2,671,334 | Gunn | Mar. 9, 1954 |